US006691304B1

(12) United States Patent
Zhang et al.

(10) Patent No.: US 6,691,304 B1
(45) Date of Patent: Feb. 10, 2004

(54) MONITOR CONVERSION IN A MULTI-THREADED COMPUTER SYSTEM

(75) Inventors: Hong Zhang, Redwood City, CA (US); Sheng Liang, Cupertino, CA (US); Lars Bak, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/511,644

(22) Filed: Feb. 22, 2000

Related U.S. Application Data

(60) Provisional application No. 60/121,957, filed on Feb. 25, 1999.

(51) Int. Cl.[7] ............................................. G06F 9/45
(52) U.S. Cl. ........................................ 717/127; 709/108
(58) Field of Search .............................. 709/100, 104, 709/108; 717/127

(56) References Cited

U.S. PATENT DOCUMENTS

| | | | | |
|---|---|---|---|---|
| 5,761,670 A | * | 6/1998 | Joy | 707/103 R |
| 6,247,025 B1 | * | 6/2001 | Bacon | 707/206 |
| 6,314,563 B1 | * | 11/2001 | Agesen et al. | 717/108 |
| 6,411,983 B1 | * | 6/2002 | Gallop | 709/104 |
| 6,470,376 B1 | * | 10/2002 | Tanaka et al. | 709/108 |

OTHER PUBLICATIONS

Bacon, et al., "Thin Locks: Featherweight Synchronization for Java", 1998, IBM T.J. Watson Research Center, pp. 258–265.*

Bacon et al., Thin Locks: Featherweight Synchronization in Java, 1998, ACM, p. 258–268.*

Bacon et al., "Thin Locks: Featherweight synchronization for Java", May 1, 1998, ACM SIGPLAN Notices, US, Association for Computer Machinery, New York, vol. 33, No. 5, pp. 258–268.

"Weak Locks with Two–Level Locking Multi–Computer System Protocol to Reduce Locking–Holding Time", Aug. 1, 1990, IBM Technical Disclosure Bullentin, US, IBM, Corporation, New York, vol. 33, No. 3B, pp. 287–289.

Lui et al., "Priority Inheritance Protocols: An Approach to Real–Time Synchronization", Sep. 1, 1990, IEEE Transactions on Computers, US, IEEE Inc., New York, vol. 39, No. 9, pp. 1175–1185.

* cited by examiner

*Primary Examiner*—John Chavis
(74) *Attorney, Agent, or Firm*—Beyer Weaver & Thomas LLP

(57) ABSTRACT

Methods and apparatus for converting a lightweight monitor to a heavyweight monitor are disclosed. According to one aspect of the present invention, a computer-implemented method for converting a lightweight monitor to a heavyweight monitor when an object that is owned by a second thread is unavailable to a first thread includes creating a new heavyweight monitor and setting the ownership of the new heavyweight monitor to the second thread. The first thread then enters the newly created heavyweight monitor without being forced to spin lock until the object is released by the second object.

17 Claims, 12 Drawing Sheets

MONITOR CONVERSION IN A MULTI-THREADED COMPUTER SYSTEM

This application claims the benefit of provisional application Ser. No. 60/121,957 filed Feb. 25, 1999.

BACKGROUND OF THE INVENTION

1. Field of the Invention

The invention relates generally to methods and apparatus for converting a lightweight monitor to a heavyweight monitor in an object-based computing system. More particularly, the invention relates to methods and apparatus for atomically converting a lightweight monitor associated with a contended object to a corresponding heavyweight monitor in an object-based computing system.

2. Related Art

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

During the execution of an object-based program, a thread may attempt to execute operations that involve multiple objects. On the other hand, multiple threads may attempt to execute operations that involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

Synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object.

Typically, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

When threads are synchronized, in order to make certain that only the thread that possesses an object lock is allowed to operate on a locked object, synchronization constructs are generally provided. One such synchronization construct is known in the art as the monitor. Typically, monitors are implemented using low-level synchronization primitives such as mutexes and the like. Even though programs may perform monitor operations on any object, it is generally too space inefficient to include a monitor implementation for every object. One such synchronization construct is referred to as a monitor. Generally, a monitor is arranged such that only the thread that owns the monitor associated with an object is permitted to execute a synchronized operation on that object. Monitors may be either lightweight or heavyweight. Typically, lightweight monitors are preferable for objects that are not subject to contention, whereas heavyweight monitors are preferably used to handle contended monitor operations.

One particular implementation of a lightweight monitor is described in "Thin Locks: Featherweight Synchronization for Java" by David F. Bacon et al. (1998), 258–268 which is incorporated by reference in its entirety. As described, the lightweight monitor is formed of bits reserved in the object header that identifies which thread, in the form of a thread ID, owns the lightweight monitor and therefore has locked the associated object. Typically, lightweight monitors are used for objects that are not subject to contention, i.e.; do not have wait, notify, or notifyALL operations performed upon them. FIG. 1A illustrates an object header 100 and an associated lightweight monitor 102. The lightweight monitor 102 includes a thread identifier field (also referred to as an owner field) 104 containing the thread ID of the thread that owns the lightweight monitor 102. The lightweight monitor 102 also includes a recursion counter 106 indicating the number of times that the current thread has re-entered the lightweight monitor. The lightweight monitor 102 also includes a heavyweight monitor flag 108 used to identify the lightweight monitor 102 as a lightweight monitor when the heavyweight monitor flag is set to "0".

In the situation where the owner field 104 is zero, the lightweight monitor 102 is unowned and therefor unlocked. If, however, the owner field 104 contains a thread ID representative of the current thread that owns the lightweight monitor 102.

In order to enter a lightweight monitor, a thread 110 typically performs a compare and swap operation on the object header 100 that contains the lightweight monitor 102. In a compare and swap operation, the new value of the compare and swap operator is the thread ID associated with the thread 110 and the comperand of the compare and swap operator is zero. With this arrangement, if the compare and swap operation is successful, then the thread ID, recursion counter, and all flags (such as the heavyweight monitor flag 108) in the lightweight monitor 102 had been all been initially zero indicating that the lightweight monitor 102 was un-owned and, therefor, un-locked. After the successful completion of the compare and swap operation, the owner field 104 now contains the thread ID associated with the thread 110 indicating that the thread 110 owns the lightweight monitor 102 and has therefor locked the lightweight monitor 102.

In those cases where a thread is re-entering a monitor that it already owns (i.e.; the thread is re-entrant), the re-entering thread must first increment the recursion counter 106 without causing an overflow condition. In those situations where a re-entering thread does cause an overflow condition, the re-entering thread must convert the lightweight monitor 102 into a heavyweight monitor 114 that is built upon a system monitor 116. It should be noted that, by design, only the current owner of the system monitor 116 is capable of converting the lightweight monitor 102 to the heavyweight monitor 114. Typically, this conversion is accomplished by performing a compare and swap operation on the object header 100 with the new value of the compare and swap operator being a heavyweight monitor pointer corresponding to the newly created heavyweight monitor 114. In this way, after the successful compare and swap operation, the object header 100 contains the heavyweight monitor pointer.

The heavyweight monitor 114 includes a recursion counter field 118 that is updated every time a particular thread re-enters the system monitor 116. The heavyweight monitor 114 also includes a heavyweight monitor owner field 120. The system monitor 116 includes a system monitor owner field 122 indicative of the current owner of the system monitor 116. The system monitor 116 is also arranged to perform particular thread operations, such as enter, exit, wait, and notify. Since the current owner (i.e.; thread 110) of the lightweight monitor 102 is the only thread capable of converting the lightweight monitor 102 to the heavyweight monitor 114, the owner of the heavyweight monitor 114 and the embedded system monitor 116 must be the same, i.e., thread 110.

Referring now to FIG. 1B, assume that a second thread 124 attempts to enter the lightweight monitor 102 that is currently owned by the thread 110. As before, the thread 124 will attempt to enter the lightweight monitor 102 by performing a compare and swap operation. In this case, however, the compare and swap operation will fail since the owner field 104 contains the thread ID corresponding to the thread 110 indicating that it owns the lightweight monitor 102. At this point, there is contention for ownership of the lightweight monitor 102 between the thread 124 and the thread 110. Since only the thread 110 (as owner of the system monitor 116) can convert the lightweight monitor 102 to the heavyweight monitor 114, the thread 124 enters a spin-lock loop until the lightweight monitor 102 is released by the thread 110. By spin lock loop, it is meant that the thread 124 enters a wait queue until such time as the thread 110 unlocks the lightweight monitor 102. As well known in the art, spin locking in general is undesirable due in part to its inefficient use of system resources. Spin locking is especially inefficient in those cases where the lightweight monitor 102 is locked for a long period of time causing other threads waiting for the lightweight monitor 102 to spin lock. In addition, "starving" lower priority threads is a distinct possibility in those situations where higher priority threads and lower priority threads are both spin locked on the lightweight monitor 102.

Therefore, what is desired is an efficient method and apparatus for resolving monitor contention in an object-based system.

SUMMARY OF THE INVENTION

Broadly speaking, the invention relates to an improved method, apparatus and computer system for efficiently converting a lightweight monitor associated with a contended object into a heavyweight monitor. According to one aspect of the invention, for a first thread to execute a synchronous operation on an object owned by a second thread, the first thread creates a new heavyweight monitor and sets the second thread as owner of the newly created heavyweight monitor. The first thread then enters the heavyweight monitor. In this manner, the first thread is not required to spin lock until such time as the second thread unlocks the object.

The invention can be implemented in numerous ways, including as a method, a computer system, and an apparatus. Several embodiments of the invention are discussed below. Methods and apparatus are disclosed. According to one aspect of the present invention, a computer-implemented method for converting a lightweight monitor to a heavyweight monitor when an object owned by a second thread is unavailable to a first thread includes determining ownership of the object associated with the lightweight monitor. If it is determined that the second thread owns the object, the first thread creates a new heavyweight monitor. The first thread then sets second thread as the owner of the newly created heavyweight monitor. The first thread then enters the newly created heavyweight monitor.

According to yet another aspect of the present invention, a computer system includes a memory and a plurality of threads. The computer system also includes a processor coupled to the memory and an object that includes an object header, the object header being arranged to contain a lightweight monitor that includes information relating to the ownership of object. A first thread selected from the plurality of threads that has locked the object as indicated by a first thread ID included in the lightweight monitor; and a second thread selected from the plurality of threads, the second thread being arranged to convert the lightweight monitor to a corresponding heavyweight monitor owned by the first thread when the object is not available to the second thread.

According to still another aspect of the invention, a computer program product for converting a lightweight monitor into a heavy weight monitor when a first thread attempts to execute a synchronous operation on an object having an object header containing the lightweight monitor is disclosed. The computer program product includes computer code that determines ownership of the object, that creates a heavyweight monitor when it is determined that the object is owned by a second thread, that sets ownership of the heavyweight monitor to the second thread; and computer code that causes the first thread to enter the heavyweight monitor; and a computer readable medium that stores the computer codes.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In a multi-threaded, object-based computing system, objects are typically provided with synchronization constructs to make it possible to prevent more than one thread from operating on an object at any particular time.

In one described embodiment of the present invention, a system that widely uses lightweight monitors is contemplated. When a first thread attempts to enter a lightweight monitor that is already owned by a second thread, the first thread creates a heavyweight monitor setting the second thread as the owner of the newly created heavyweight monitor. The first thread then enters the newly created heavyweight monitor. In this way, the first thread does not wait until the second thread releases the lightweight monitor.

Figure 1A:
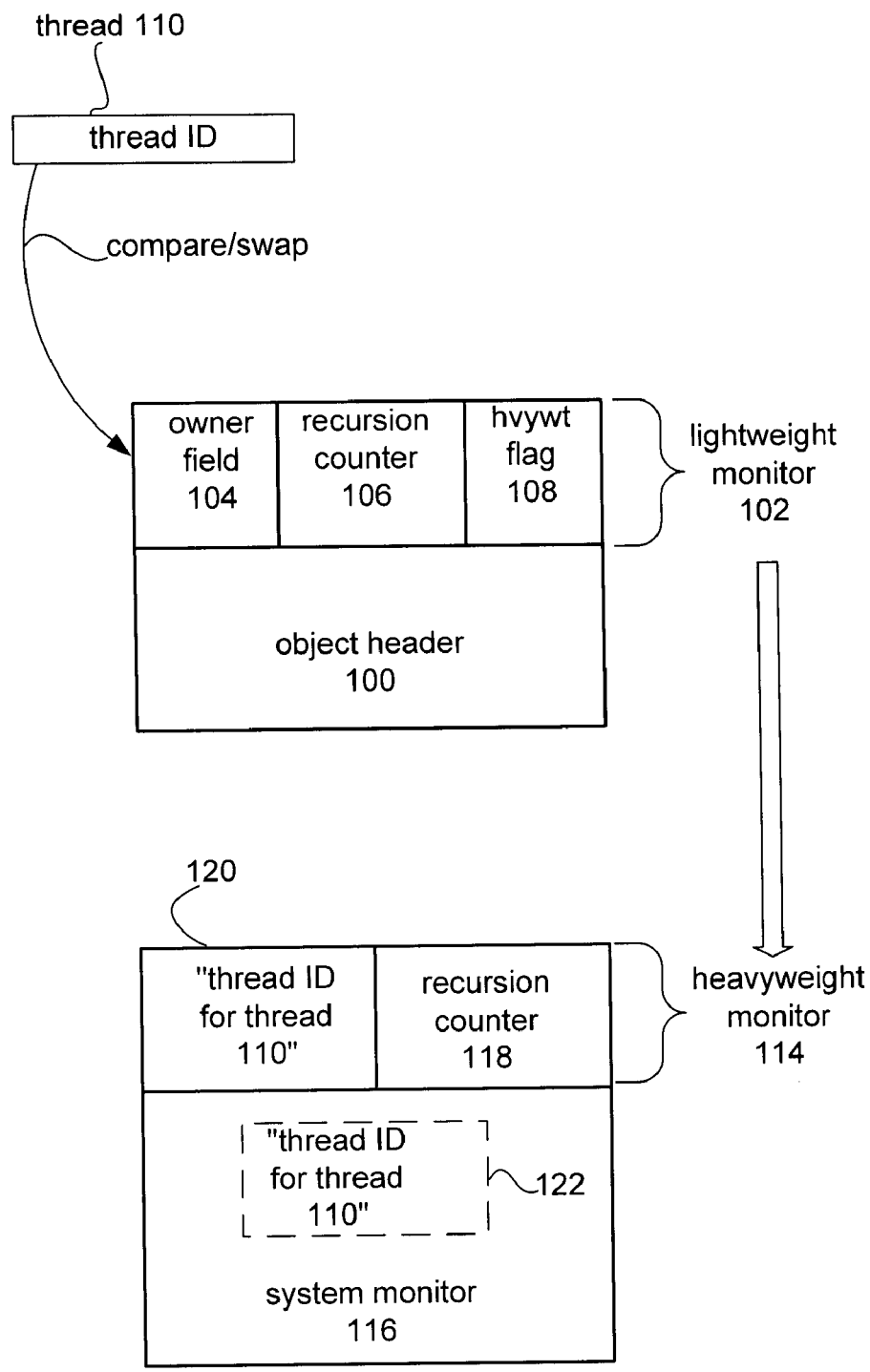
FIG. 1A is an illustration of a conventional conversion of a lightweight monitor to a heavyweight monitor.
Figure 1B:
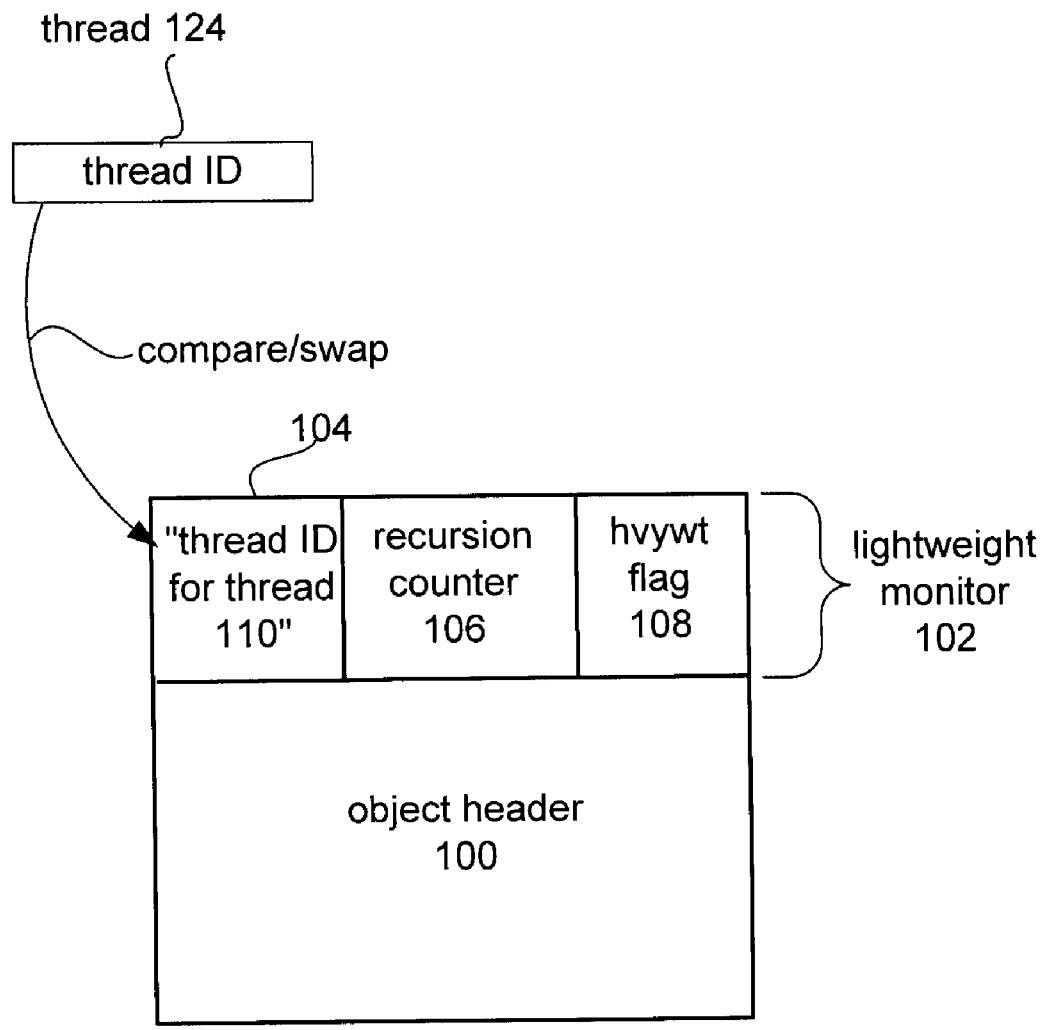
FIG. 1B is an illustration of a contended lightweight monitor.
Figure 2:
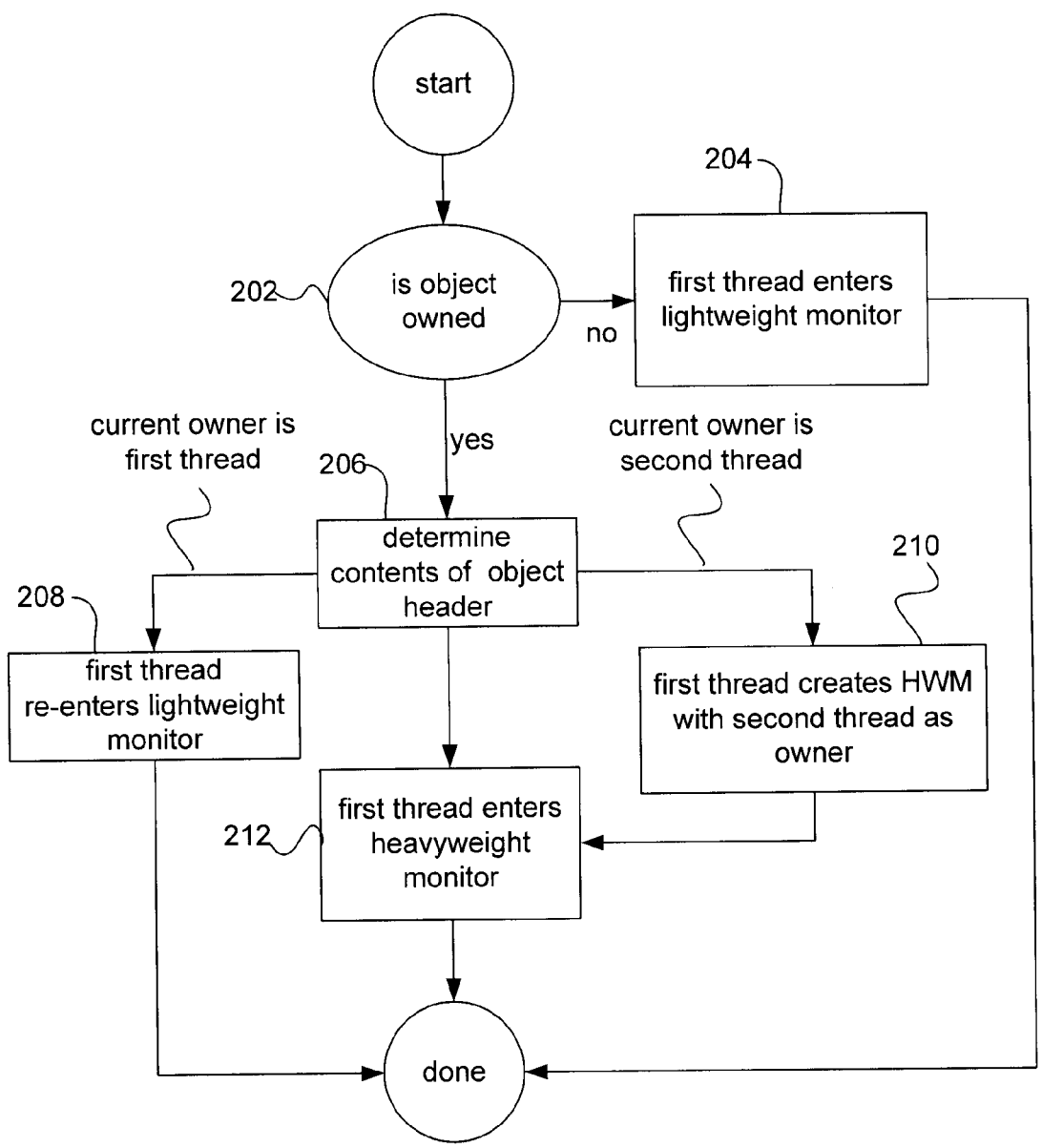
FIG. 2 is a flowchart detailing a process for a thread obtaining ownership of an object in accordance with an embodiment of the invention.

FIG. 2 is a flowchart detailing a process 200 for a first thread obtaining ownership of an object in accordance with an embodiment of the invention. The process 200 begins at 202 by a determination of whether or not the object is currently owned. In the described embodiment, the object header includes a lightweight monitor having an owner field and a heavyweight monitor flag. If the owner field is zero, then the object is un-owned, otherwise, the object is owned by the thread whose thread ID is contained in the owner field. If it is determined that the object is not owned, then the requesting thread takes ownership of the object by inputting its own thread ID into the owner field of the lightweight monitor associated with the object at 204.

If, however, it is determined at 202 that the object is owned, then the contents of the object's header is evaluated at 206. If the object header contains a lightweight monitor whose owner field contains the thread ID of the first thread, then the first thread currently owns the lightweight monitor associated with the object. The first thread is, in this case, what is referred to as re-entrant. By re-entrant it is meant that as the current owner of the object, the first thread is attempting to re-enter the lightweight monitor associated with the object. Such situations occur when, for example, a thread releases an object and then re-acquires the object by re-entering the associated lightweight monitor some time later. Once it is determined that the first thread is the current thread, the first thread re-enters the lightweight monitor at 208 by incrementing the recursion counter included in the lightweight monitor.

If, however, it is determined at 206 that the object header contains a heavyweight monitor pointer corresponding to a heavyweight monitor, then the first thread enters the corresponding heavyweight monitor at 210.

If, however, it is determined at 206 that the object header contains a thread ID corresponding to a second thread that is different from the first thread, then the lightweight monitor is owned by the second thread. In this situation, there is contention between the first thread and the second thread for ownership of the object. In order to resolve contention between these two threads in accordance with an embodiment of the invention, the first thread creates a new heavyweight monitor setting the owner of the newly created heavyweight monitor as the second thread at 212. In this way, the first thread can then enter the newly created heavyweight monitor at 210 without waiting until the second thread releases the lightweight monitor associated with the object. In this way, the contention between the first thread and the second thread for ownership of the object is resolved without the necessity for the first thread to, for example, spin lock until the lightweight monitor is released.

It should be noted, however, that in order for the first thread to create a heavyweight monitor, it must first own the system monitor embedded in the newly created heavyweight monitor. By setting the owner of the newly created heavyweight monitor as the second thread, however, a potential conflict is created since the thread performing the lightweight to heavyweight monitor conversion in not necessarily the owner of the lightweight monitor. By way of example, if the first thread converts a lightweight monitor to a heavyweight monitor owned by the second thread, then the system monitor is owned by the first thread and the heavyweight monitor is owned by the second thread. This conflict is resolved with the introduction of a lienholder field and lienholder recursion field that is included in the newly created heavyweight monitor at 212. In the described embodiment, the lienholder field identifies the second thread as owner of the lightweight monitor that was converted to the heavyweight monitor.

Figure 3A:
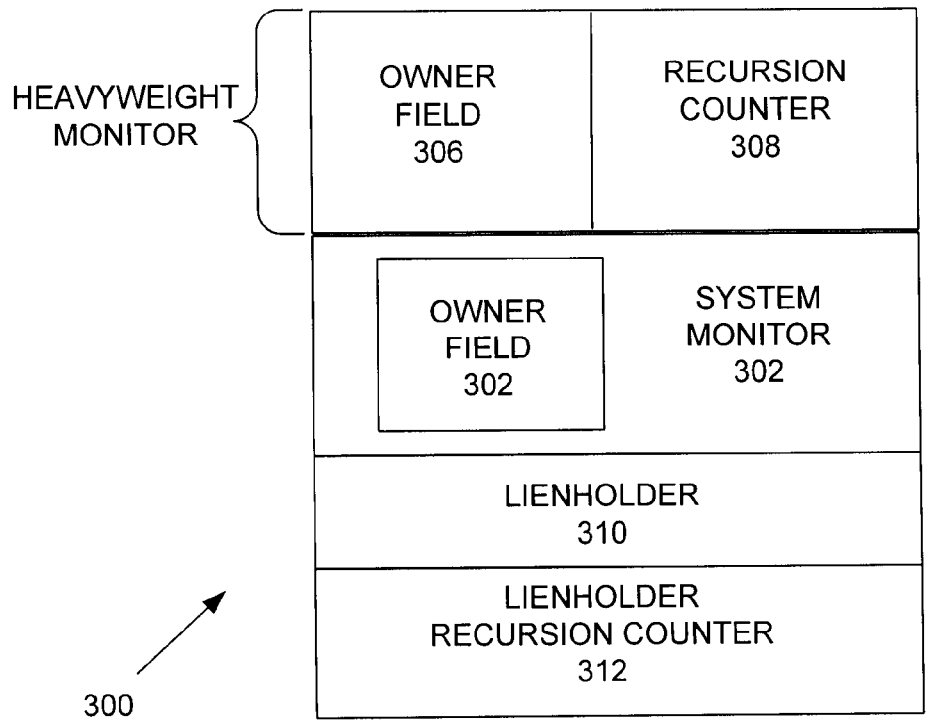
FIG. 3A is an illustration of a heavyweight monitor implemented in accordance with an embodiment of the invention.

FIG. 3A illustrates a heavyweight monitor 300 in accordance with an embodiment of the invention. The heavyweight monitor 300 is built upon a system monitor 302 that includes a system monitor owner field 304. The heavyweight monitor includes an owner field 306 and a recursion counter field 308. In the described embodiment, the heavyweight monitor 200 also includes a lienholder field 310 and a lienholder recursion field 312. The lienholder field 310 and the lienholder recursion field 312 are used to temporarily hold the owner and the recursion count of the lightweight monitor from which the heavyweight monitor has been converted.

Figure 3B:
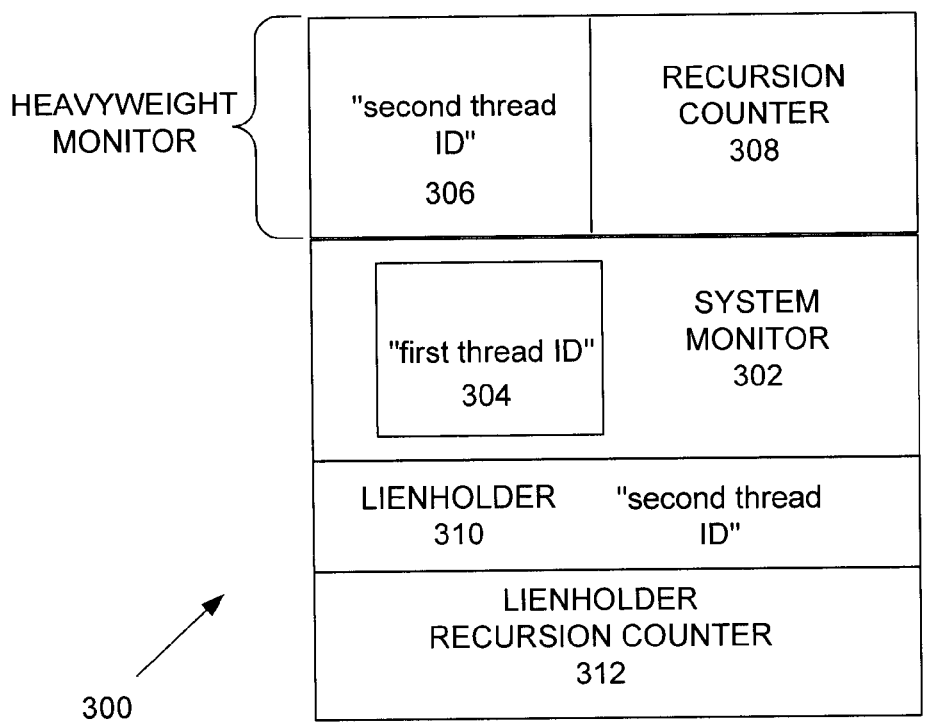
FIG. 3B is an illustration of the heavyweight monitor of FIG. 3A formed by converting a lightweight monitor.

By way of example, FIG. 3B illustrates the heavyweight monitor 300 if created by the first thread at block 212 of FIG. 2. Since the first-thread owns the system monitor 302, the system monitor owner field 304 contains the thread ID of the first thread while the thread ID of the second thread is contained in the heavyweight monitor owner field 306. Since the second thread owned the lightweight monitor from which was formed the heavyweight monitor 300, the true owner of the heavyweight monitor 300 is the second thread and not the first thread. In a preferred embodiment, the lienholder field 310 contains the thread ID of the second thread thereby preserving the identity of true owner of the heavyweight monitor 300.

Figure 4:
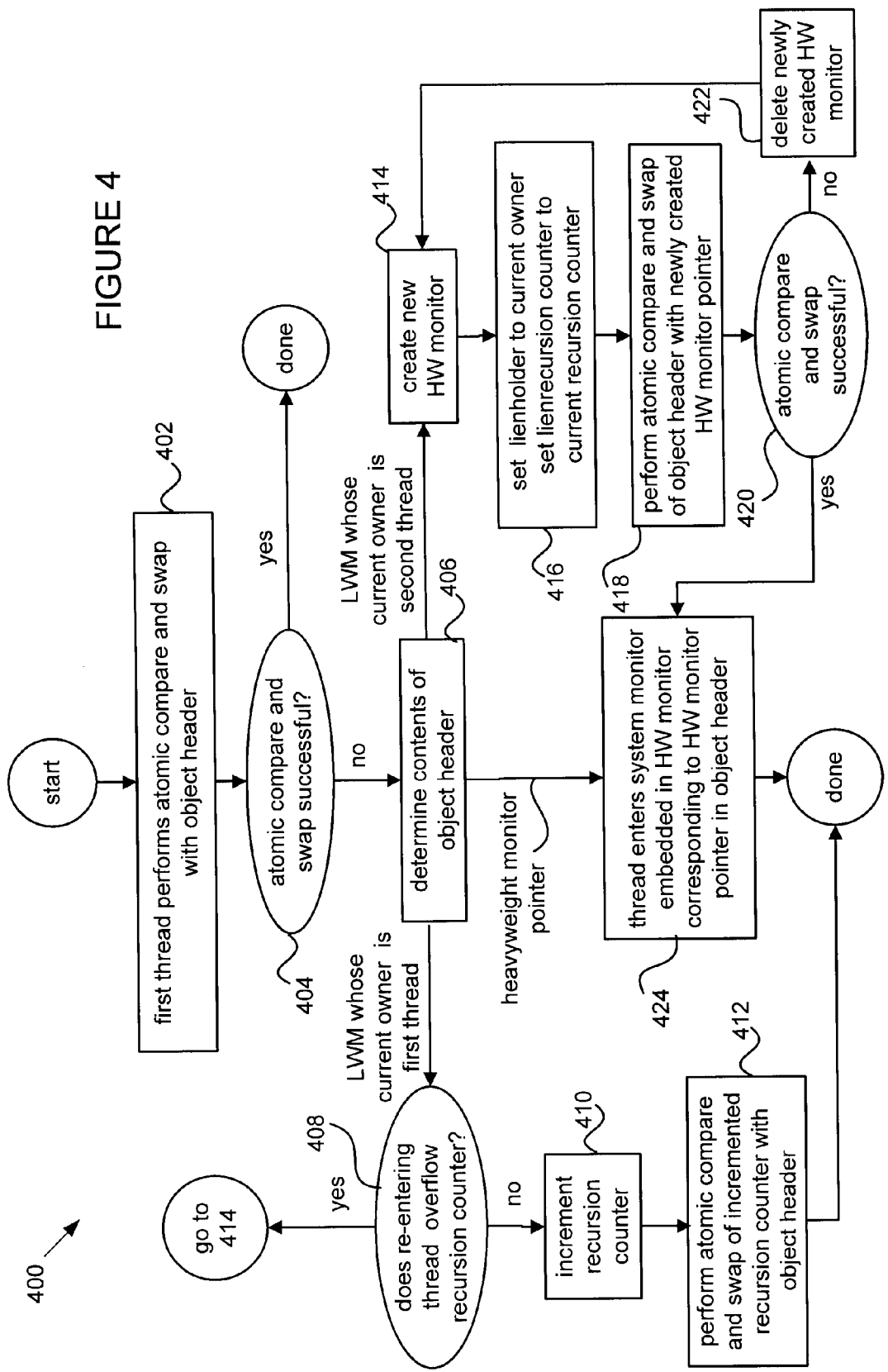
FIG. 4 is a flowchart detailing one implementation of the process of FIG. 2.

FIG. 4 is a process 400 for a first thread to obtain ownership of an object in accordance with an embodiment of the invention. It should be noted that the process 400 is only one possible embodiment of the process 200 and, as such, begins at 402 by the first thread determining if the object is owned. In the described embodiment, ownership of the object is determined by performing an atomic compare and swap operation with the lightweight monitor that is included in the object header. As noted above, since the atomic compare and swap operator includes a comperand value of "0", a successful compare and swap operation indicates that the object is un-owned and all data fields contained within the lightweight monitor are "0".

If, at 404, the atomic compare and swap operation was determined to be successful, then the object was un-owned and is now owned by the first thread. However, if the atomic compare and swap operation was not successful, then at least one field in the lightweight monitor was not zero. In this case, the object header is evaluated at 406 to determine why the compare and swap operation failed.

If, at 406, it was determined that the object header contains a lightweight monitor that contains the thread ID of the first thread, then the first thread is the current owner of the lightweight monitor and is thereby considered to be re-entrant. In this case, a determination at 408 is made whether or not incrementing the recursion counter included in the lightweight monitor would result in an overflow condition. If, incrementing the recursion counter would not result in an overflow condition, then the recursion counter in the lightweight monitor is appropriately incremented at 410. Once the recursion counter is appropriately incremented, the first thread re-enters the lightweight monitor by, in one embodiment, performing an atomic compare and swap of the incremented recursion counter with the object header at 412.

Returning to 408, if it is determined that incrementing the recursion counter would result in an overflow condition, then the first thread creates a new heavyweight monitor at 414.

Returning to 406, if it is determined that the object header contains a lightweight monitor that is currently owned by a second thread, different from the first, then the first thread creates a heavyweight monitor at 414. At 416, the lienholder is set to the current owner of the lightweight monitor (i.e., the second thread) and the lienholder recursion counter to the current recursion counter. An atomic compare and swap operation is then performed at 418. In this way, the heavyweight monitor pointer corresponding to the newly created heavyweight monitor is inserted into the object header. If at 420 it was determined that the atomic compare and swap operation was not successful, then the newly created heavyweight monitor is deleted at 422 and a new heavyweight monitor is created at 414. The atomic compare and swap can fail, for example, if a third thread takes ownership of the heavyweight monitor before the atomic compare and swap takes place.

If, however, the atomic compare and swap succeeds, then at 424 the first thread enters the system monitor embedded in the heavyweight monitor corresponding to the heavyweight monitor pointed contained within the object header. At this point, the first thread has successfully entered the system monitor of the heavyweight monitor corresponding to the heavyweight monitor pointer contained in the object header. However, it is now necessary to assure that the system monitor owner and the heavyweight monitor owner is one and the same.

Figure 5:
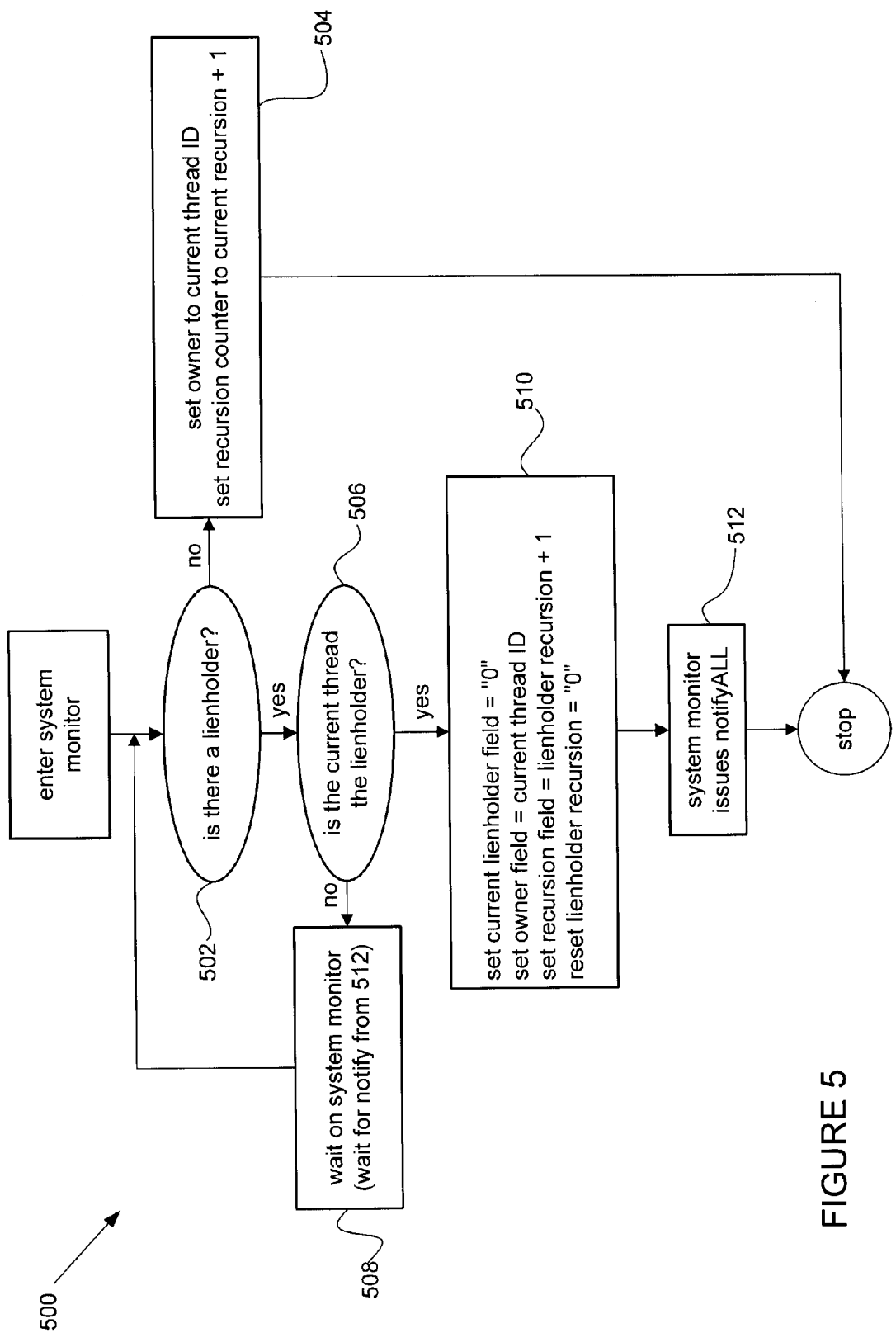
FIG. 5 is a flowchart detailing a monitor enter operation in accordance with an embodiment of the invention.

FIG. 5 is a flowchart detailing a process 500 for a thread entering a heavyweight monitor in accordance with an embodiment of the invention. It should be noted that the process 500 is one implementation of the entering 424 of the process 400. More particularly, the process 500 begins at 502 where a determination is made whether or not a lienholder exists. In one embodiment, the determination of whether or not a lienholder exists is accomplished by determining if the lienholder field contains a non-zero value. If the lienholder field is "0", then there is no lienholder, otherwise, the lienholder is the thread pointed to by the thread ID contained in the lienholder field. If there is no lienholder (i.e., lienholder field is zero), then the owner field of the heavyweight monitor is set to the current thread ID and the heavyweight recursion counter is set to the current recursion counter incremented by one at 504. The recursion counter is incremented to compensate for re-entering the system monitor.

If, however, if it was determined at 502 that there is a lienholder, then a determination is made at 506 whether or not the lienholder is the current thread. In one embodiment, the lienholder identification is accomplished by reading the contents of the lienholder field and determining the thread ID contained therein. If the current thread is not the lienholder thread, it must yield the monitor ownership to the lienholder thread by calling a system wait at 508. The current thread will be woken up by the lienholder thread after the lienholder thread regains monitor ownership.

If, at 506, the current thread is determined to be the lienholder, then at 510 the heavyweight monitor is updated. In one embodiment, the heavyweight monitor is updated by re-setting the current lienholder field to "0". The updating of the heavyweight monitor also includes setting the owner field of the heavyweight monitor to the thread ID corresponding to the current thread. In the described embodiment, the lienholder recursion field is incremented by 1 to account for the current monitor enter operation. The heavyweight monitor recursion field is then set to the value of the incremented lienholder recursion field after which the incremented lienholder recursion field is reset to zero. After the heavyweight monitor has been updated, the system monitor broadcasts a notifyALL at 512. The notifyALL wakes up the threads contained in the wait queue at 508, which are then queued for further processing by returning to 502.

Figure 6:
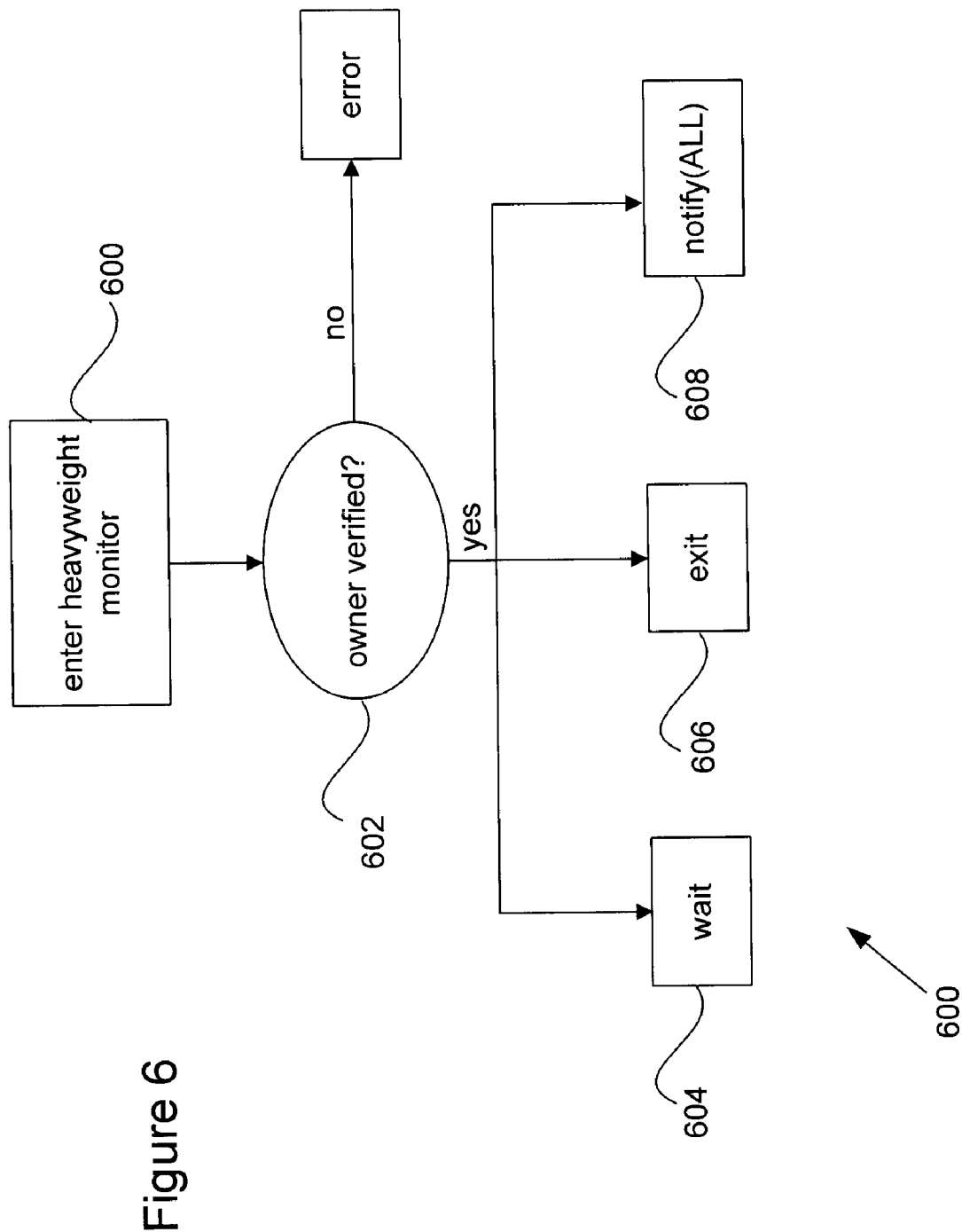
FIG. 6 illustrates a relationship between the monitor enter function and various other monitor functions in accordance with an embodiment of the invention.

FIG. 6 illustrates a relationship 600 between the enter monitor function 500 and various other monitor functions in accordance with an embodiment of the invention. In the described embodiment, a check owner function 602 makes sure that the current thread owns the heavyweight monitor. If the check owner function 602 determines that the current thread does not own the heavyweight monitor, then an error message is called, otherwise, the check owner function has succeeded and control is passed to a selected monitor function. Such monitor functions include a wait at 604, an exit at 606, and a notify (or notifyALL) at 608.

Figure 7:
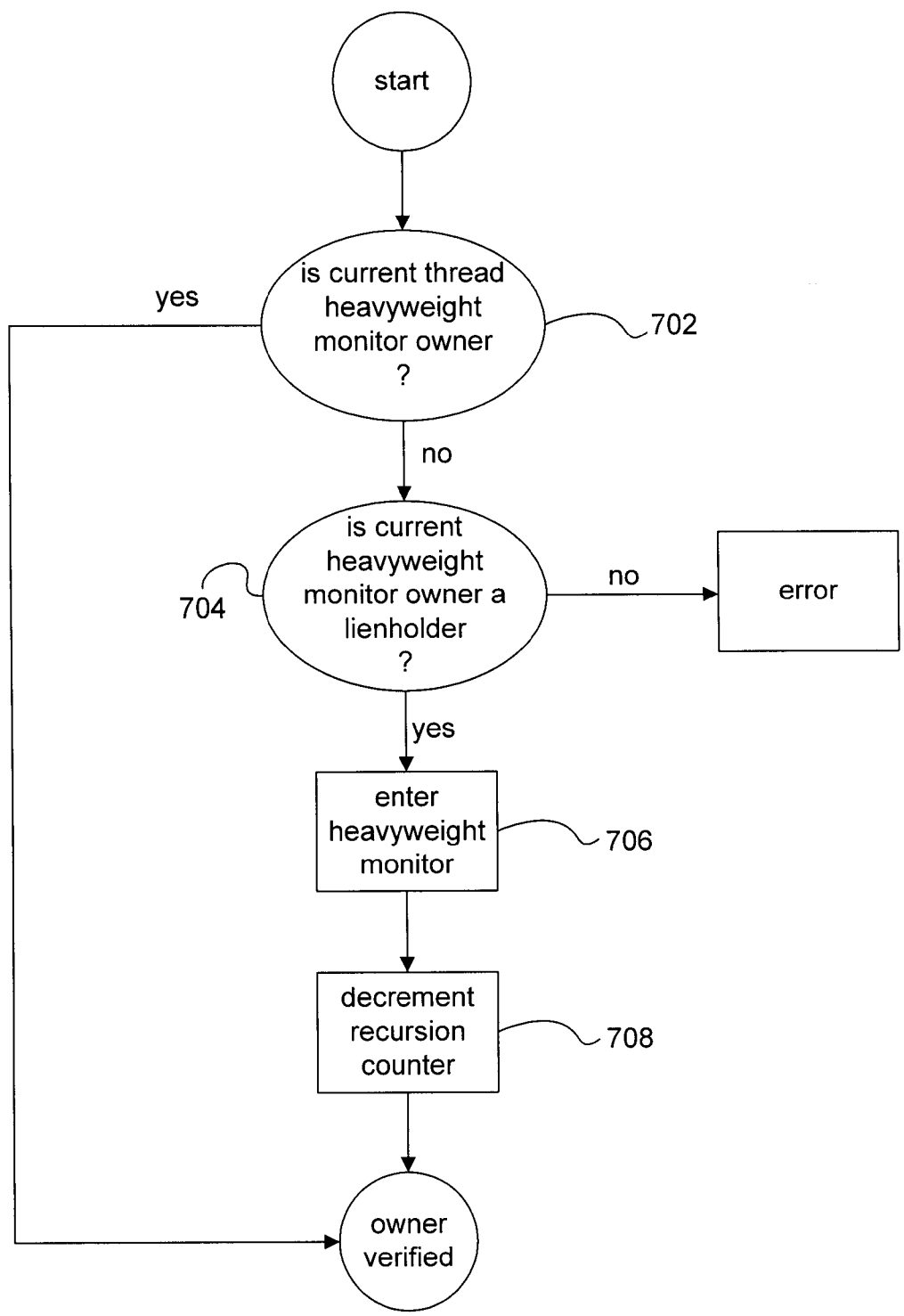
FIG. 7 is a flowchart detailing a check owner operation in accordance with an embodiment of the invention.

FIG. 7 is a flowchart detailing a check owner operation 700 in accordance with an embodiment of the invention. It should be noted that the check owner function 700 is one possible embodiment of the check owner function 602. More particularly, the check owner function 700 begins at 702 by determining if the current thread owns the heavyweight monitor. If the current thread does own the heavyweight monitor, then the heavyweight monitor owner has been verified. If, however, the current thread does not own the heavyweight monitor, then it is determined at 704 if the current thread is the lienholder. If the current thread is not the lienholder, then an error message is passed, otherwise, the current thread enters the heavyweight monitor at 706. It should be noted that, in one embodiment, the entering 706 is implemented as the entering 424. Once the current thread has successfully entered the heavyweight monitor, the recursion counter is decremented to account for the entering 706. At this point, the ownership of the heavyweight monitor is verified.

Figure 8:
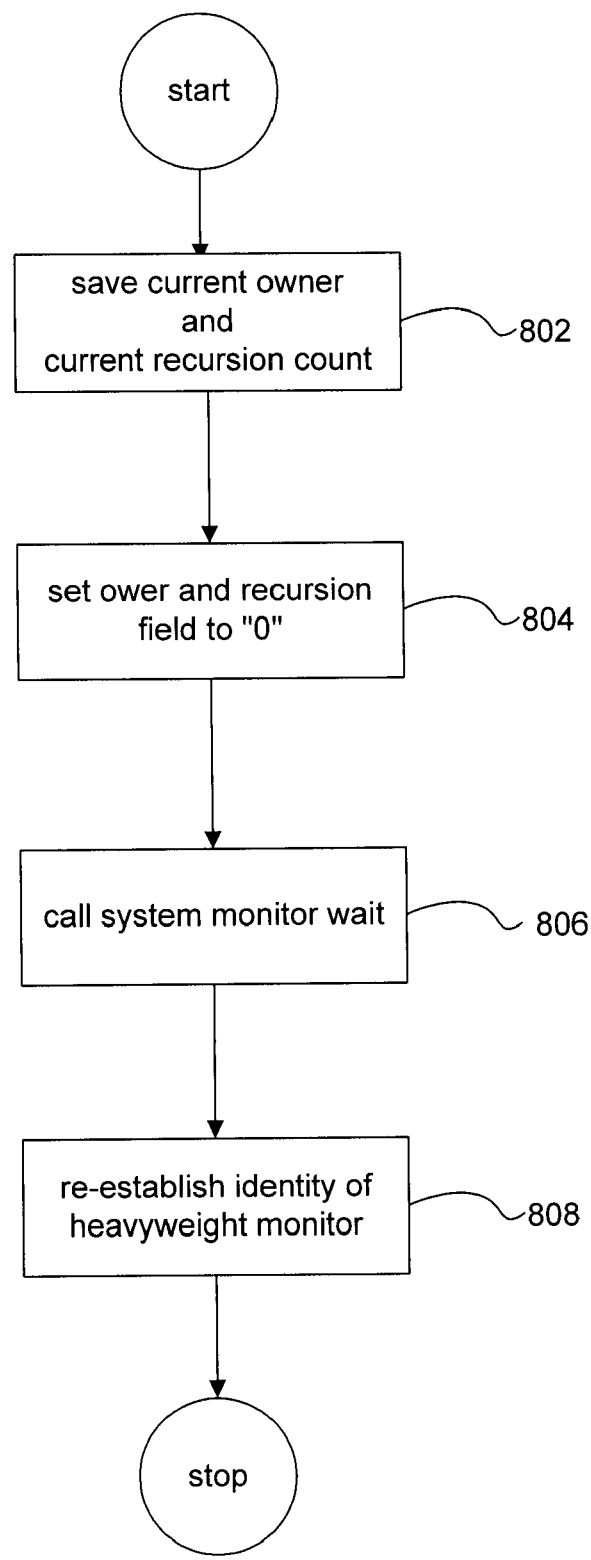
FIG. 8 is a flowchart detailing a monitor wait operation 800 in accordance with an embodiment of the invention.

FIG. 8 is a flowchart detailing a monitor wait operation 800 in accordance with an embodiment of the invention. The monitor wait operation 800 is one possible embodiment of the monitor wait operation 604. It should be noted that the monitor wait operation 800 begins only after the check owner function at 602 has succeeded. More particularly, the monitor wait operation 800 begins at 802 by saving the current owner and current recursion count. Once saved, the owner and the recursion count are set to zero at 804 establishing the monitor as being un-owned Once the monitor has been un-owned, a system monitor wait is called at 806 which causes the heavyweight monitor to be released. Once the system monitor wait has been completed by issuance of a notify or notifyALL, for example, the identity of the current owner of the heavyweight monitor is re-established at 808. In one embodiment, identity is re-established by retrieving the current owner and current recursions saved at 802 and inputting to the current owner field and current recursion field, respectively, of the heavyweight monitor.

Figure 9:
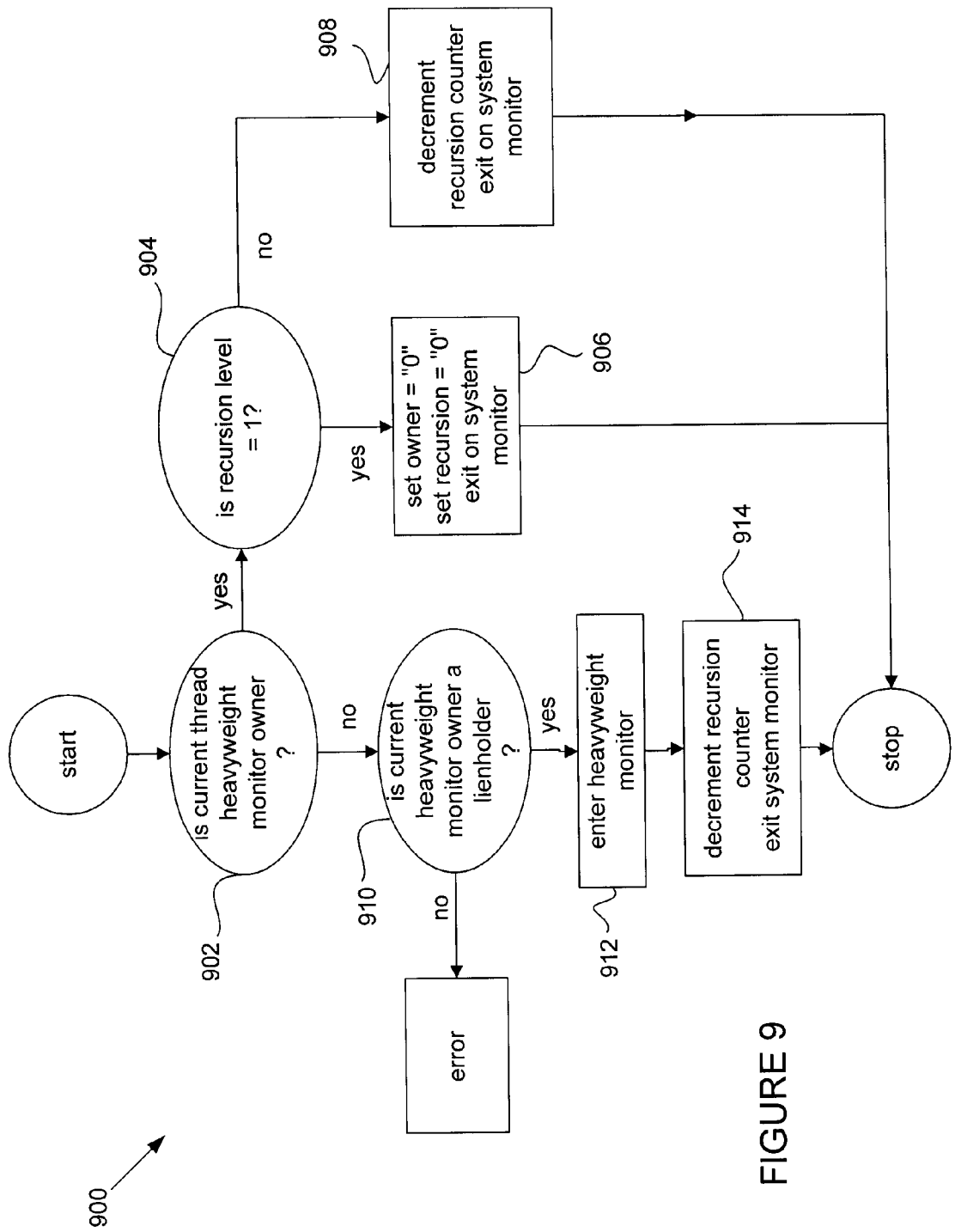
FIG. 9 is a flowchart detailing an exit function in accordance with an embodiment of the invention.

FIG. 9 is a flowchart detailing an exit function 900 in accordance with an embodiment of the invention. It should be noted that the exit function 900 is one possible embodiment of the exit function 606. More particularly, the exit function 900 begins at 902 by determining if the current thread is the owner of the heavyweight monitor. If it is determined that the current thread is the owner of the heavyweight monitor, then it is determined at 904 is the recursion level is 1. If the recursion level is 1, then owner field is set to "0", the recursion count is set to "0" and the system monitor is exited at 906. If, however, at 904 it was determined that the recursion count was not "1", then the recursion counter is decremented and the system monitor is exited at 908. In either case, the exit function has been successful.

Returning to 902, if the current thread is not the heavyweight monitor owner, then a determination is made at 910 if the current heavyweight monitor owner is the lienholder. If not, an error message is called. In one embodiment, an exit has been called without a corresponding enter operation which is impermissible. If, however, the current heavyweight monitor owner is the lienholder, then the lienholder thread enters the heavyweight monitor at 912. In the described embodiment, the entering 912 is implemented as the entering 414. Once the lienholder thread has successfully entered the heavyweight monitor, the recursion counter is decremented in order to compensate for the entering at 912. At this point, the exit function has succeeded.

Figure 10:
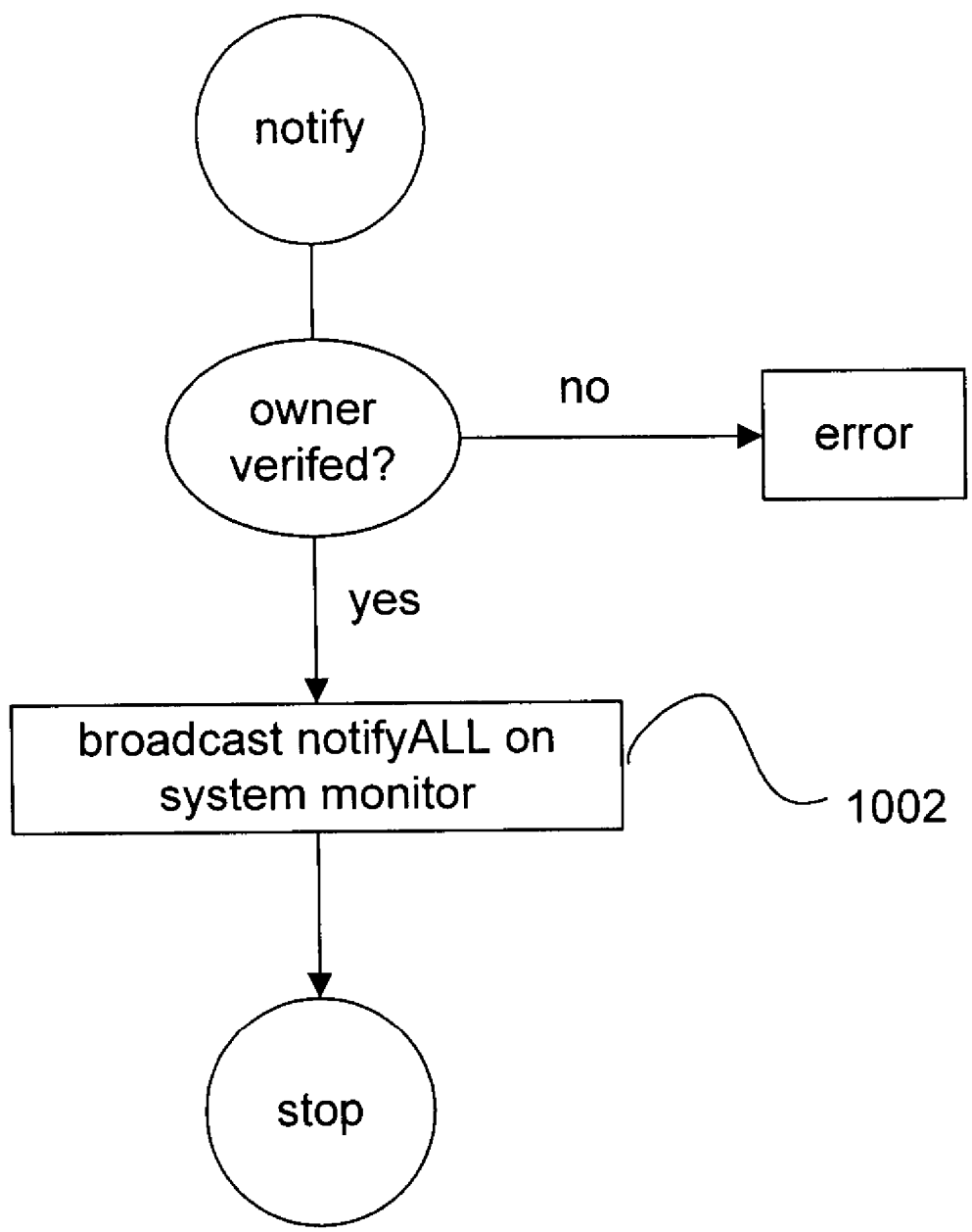
FIG. 10 is a flowchart detailing a notify (or notifyALL) function in accordance with an embodiment of the invention.

FIG. 10 is a flowchart detailing a notify (or notifyALL) function 1000 in accordance with an embodiment of the invention. The notify (or notifyALL) function 1000 is one possible embodiment of the notify (or notifyALL) function 608. It should be noted that the notify (or notifyALL) function 1000 begins only after the check owner function at 602 has succeeded. More particularly, the notify (or notifyALL) function 1000 begins at 1002 calling a notify (or notifyALL) on the system monitor.

Figure 11:
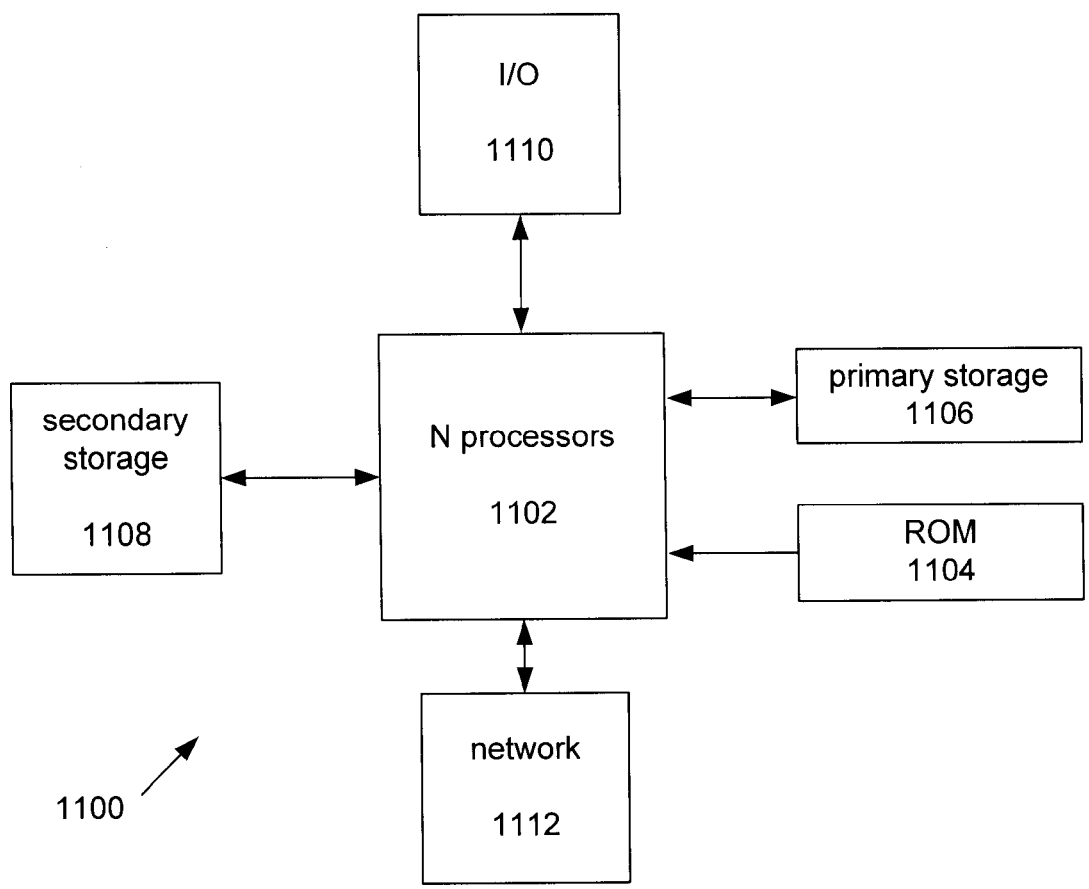
FIG. 11 illustrates a typical, general-purpose computer system suitable for implementing the present invention.

FIG. 11 illustrates a typical, general-purpose computer system 1100 suitable for implementing the present invention. The computer system 1100 includes any number of processors 1102 (also referred to as central processing units, or CPUs) that are coupled to memory devices including primary storage devices 1104 (typically a read only memory, or ROM) and primary storage devices 1106 (typically a random access memory, or RAM).

Computer system 1100 or, more specifically, CPUs 1102, may be arranged to support a virtual machine, as will be appreciated by those skilled in the art. One example of a virtual machine that is supported on computer system 1100 will be described below with reference to FIG. 7. As is well known in the art, ROM acts to transfer data and instructions uni-directionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data uni-directionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, steps involved with locking an object and unlocking an object may be reordered. Steps may also be removed or added without departing from the spirit or the scope of the present invention.

Although the methods of converting a lightweight monitor to a heavyweight monitor in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Monitors have been described as being bits that identify whether an object is locked, unlocked, or busy. It should be noted that the number of bits associated with a monitor are generally be widely varied. In addition, it should be appreciated that the status of an object may be identified using mechanisms other than a monitor. By way of example, the object may include a pointer to a list that identifies the status of the object.

While the present invention has been described as being used with a computer system that has an associated virtual machine, it should be appreciated that the present invention may generally be implemented on any suitable object-oriented computer system. Specifically, the methods of locking an unlocking an object in accordance with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer implemented method for resolving monitor contention when a lightweight monitor is converted into a heavy weight monitor in a multi-threaded computer system, comprising:

determining contents of an object header by a first thread;
   if it is determined that the object header contains a lightweight monitor that is currently owned by a second thread that is different from the first thread then,
   creating a heavyweight monitor by the first thread having an associated heavyweight monitor pointer;
   identifying the second thread as a current owner of the lightweight monitor as a lienholder;
   setting a lienholder recursion count in a lienholder recursion counter to a current recursion count;
   inserting the heavyweight monitor pointer into the object header; and
   entering a system monitor embedded in the heavyweight monitor corresponding to the heavyweight monitor pointer by the first thread.

2. A method as recited in claim 1, wherein the inserting comprises:

performing a successful atomic compare and swap operation of the object header and the heavyweight monitor pointer.

3. A method as recited in claim 2, wherein when it is determined that the atomic compare and swap operation is not successful, then deleting the heavyweight monitor;
   creating a new heavyweight monitor by the first thread having an associated heavyweight monitor pointer; and
   returning to the setting a lienholder field.

4. A method as recited in claim 1, wherein when it is determined that the object header contains a lightweight monitor owned by the first thread, then determining if the first thread as a re-entering thread causes a recursion counter to overflow;
   incrementing the recursion counter when the recursion counter does not overflow; and
   performing an atomic compare and swap of the incremented recursion counter and the object header.

5. A method as recited in claim 1, wherein when the object header contains a heavyweight monitor pointer then, entering a system monitor embedded in the heavyweight monitor corresponding to the heavyweight monitor pointer by the first thread.

6. A method as recited in claim 1, wherein the entering a system monitor further comprises:

determining if a current thread is the lienholder;
   setting a current lienholder field to a first value;
   setting an owner field to a current thread ID;
   setting a recursion field equal to a lienholder recursion plus a second value;
   resetting a lienholder recursion field to the first value.

7. A method as recited in claim 1, issuing a notifyALL command by the system monitor.

8. A method as recited in claim 4, wherein when it is determined that incrementing the recursion counter will cause an overflow condition, then inflating the lightweight monitor to a corresponding heavyweight monitor.

9. A method as recited in claim 6, wherein the first value is a zero (0) and the second value is a one (1).

10. A computer program product for resolving monitor contention when a lightweight monitor is converted into a heavy weight monitor when a first thread attempts to execute a synchronous operation on an object associated with the lightweight monitor, the object having an object header containing the lightweight monitor, comprising:

computer code for determining contents of an object header by a first thread;
    if it is determined that the object header contains a lightweight monitor that is currently owned by a second thread that is different from the first thread then,
    computer code for creating a heavyweight monitor by the first thread having an associated heavyweight monitor pointer;
    computer code for identifying the second thread as a current owner of the lightweight monitor as a lienholder;
    computer code for setting a lienholder recursion count in a lienholder recursion counter to a current recursion count;
    computer code for inserting the heavyweight monitor pointer into the object header;
    computer code for entering a system monitor embedded in the heavyweight monitor corresponding to the heavyweight monitor pointer by the first thread; and
    a computer readable medium that stores the computer codes.

11. A computer program product according to claim 10 wherein the computer readable medium is a data signal embodied in a carrier wave.

12. A computer program product according to claim 10 further including computer code for performing an atomic compare and swap operation of the object header and the heavyweight monitor pointer.

13. A computer program product according to claim 10 wherein when it is determined that the atomic compare and swap operation is not successful, then computer code for deleting the heavyweight monitor;
    computer code for creating a new heavyweight monitor by the first thread having an associated heavyweight monitor pointer; and
    computer code for returning to the setting a lienholder field.

14. A computer program product according to claim 10 wherein when it is determined that the object header contains a lightweight monitor owned by the first thread, then computer code for determining if the first thread as a re-entering thread causes a recursion counter to overflow;

computer code for incrementing the recursion counter when the recursion counter does not overflow; and computer code for performing an atomic compare and swap of the incremented recursion counter and the object header.

15. A computer system including a memory which includes a plurality of threads, each of the plurality of threads, the computer system comprising:

a processor coupled to the memory; and an object including an object header, the object header being arranged to contain a lightweight monitor which includes information relating to the ownership of object, a first thread selected from the plurality of threads, the first thread being arranged to convert the lightweight monitor to a corresponding heavyweight monitor owned by a second thread when the object is not available to the first thread; and a second thread selected from the plurality of threads, that has locked the object as indicated by a second thread ID included in the lightweight monitor creating a heavyweight monitor by the first thread having an associated heavyweight monitor pointer;

a lienholder identifier for identifying the second thread as a current owner of the lightweight monitor as a lienholder;

a lienholder recursion counter for storing a lienholder recursion count in a lienholder recursion counter to a current recursion count; and a system monitor embedded in the heavyweight monitor having the heavyweight monitor inserted therein such that the first thread then enters the system monitor thereby resolving contention for the monitor.

16. A computer system as recited in claim 15 wherein the recursion counter indicates the number of times the object has been re-entered.

17. A computer system as recited in claim 16, wherein the heavyweight monitor pointer points to the heavyweight monitor associated with the object.

* * * * *